Jan. 15, 1929.　　　　　　J. S. REYNOLDS　　　　　1,699,121
SUBSOIL PLOW
Filed March 16, 1925　　　2 Sheets-Sheet 1

INVENTOR:
JOSEPH S. REYNOLDS,
BY
ATTORNEY.

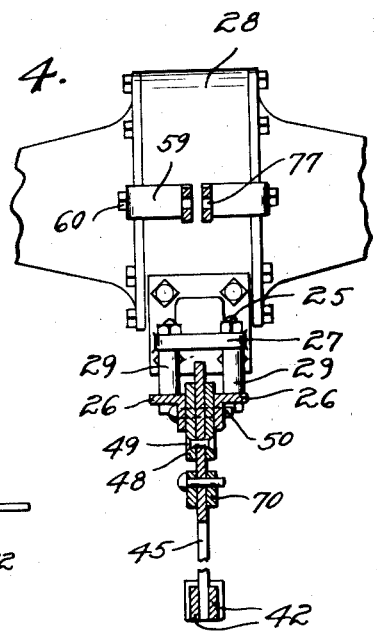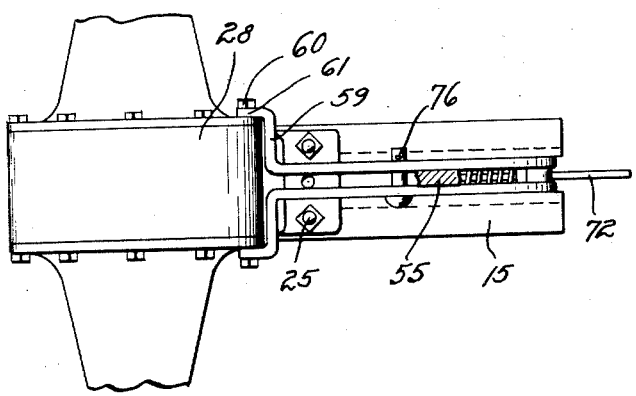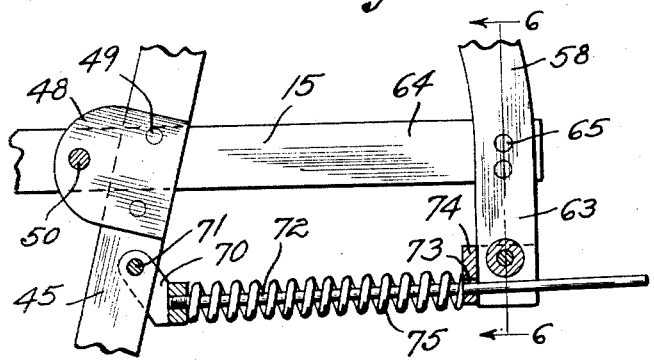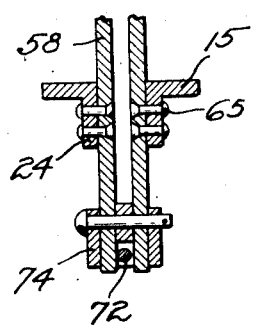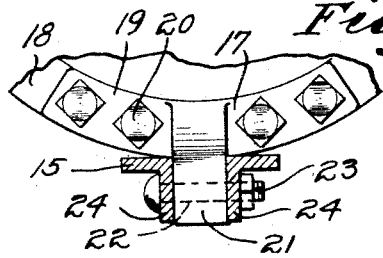

Patented Jan. 15, 1929.

1,699,121

UNITED STATES PATENT OFFICE.

JOSEPH S. REYNOLDS, OF LOS ANGELES, CALIFORNIA; SECURITY TRUST & SAVINGS BANK EXECUTOR AND OLIVE M. REYNOLDS EXECUTRIX OF SAID JOSEPH S. REYNOLDS, DECEASED.

SUBSOIL PLOW.

Application filed March 16, 1925. Serial No. 15,793.

My invention relates to agricultural implements and it relates particularly to subsoil plows. Subsoil plows are used for loosening soil below the surface of the ground to make it porous.

It is an object of my invention to provide a subsoil plow of this character which is adapted for attachment to a tractor.

It is also an object of the invention to provide a subsoil plow which is adapted to be situated beneath the tractor so that it will be out of the way.

It is also an object of my invention to provide a subsoil plow which resists a raising of the front end of the tractor. Some types of subsoil plows pull upon the tractor in such a manner that they cause the front end of the tractor to be raised off the ground, sometimes resulting in a serious accident.

It is a further object of my invention to provide a subsoil plow which is collapsible. I provide a frame which is secured to the under side of a tractor. Carried by this frame is a plow member supporting means which supports a plow member. The supporting means is so arranged that when properly actuated, the plow member will be swung from a working position into a carrying position. The plow member does not swing out of a substantially horizontal plane but folds very compactly against the under side of the tractor.

It is a further object of the invention to provide a subsoil plow of this character which has an adjustable working position. The plow member may be positioned at various levels so that a desired working depth may be obtained It is another object of this invention to provide a means for swinging the subsoil plow into carrying position.

Other objects and advantages of the invention will be made evident hereinafter.

Referring to the two sheets of drawings in which I illustrate a preferred form of my invention, Fig. 1 is a side elevational view of a tractor, partially broken away to show a preferred embodiment of the subsoil plow of my invention attached to the tractor and folded in carrying position.

Fig. 3 is a section taken on the line 3—3 of Fig. 2, this view showing the manner in which the front end of the frame of my invention is secured to the tractor.

Fig. 4 is a section taken on the line 4—4 of Fig. 2.

Fig. 5 is an enlarged fragmentary detail showing the means for collapsing the subsoil plow.

Fig. 6 is a section taken substantially on the line 6—6 of Fig. 5.

Fig. 7 is a plan view showing the stop means whereby the working position of the plow member is determined.

Figure 2:
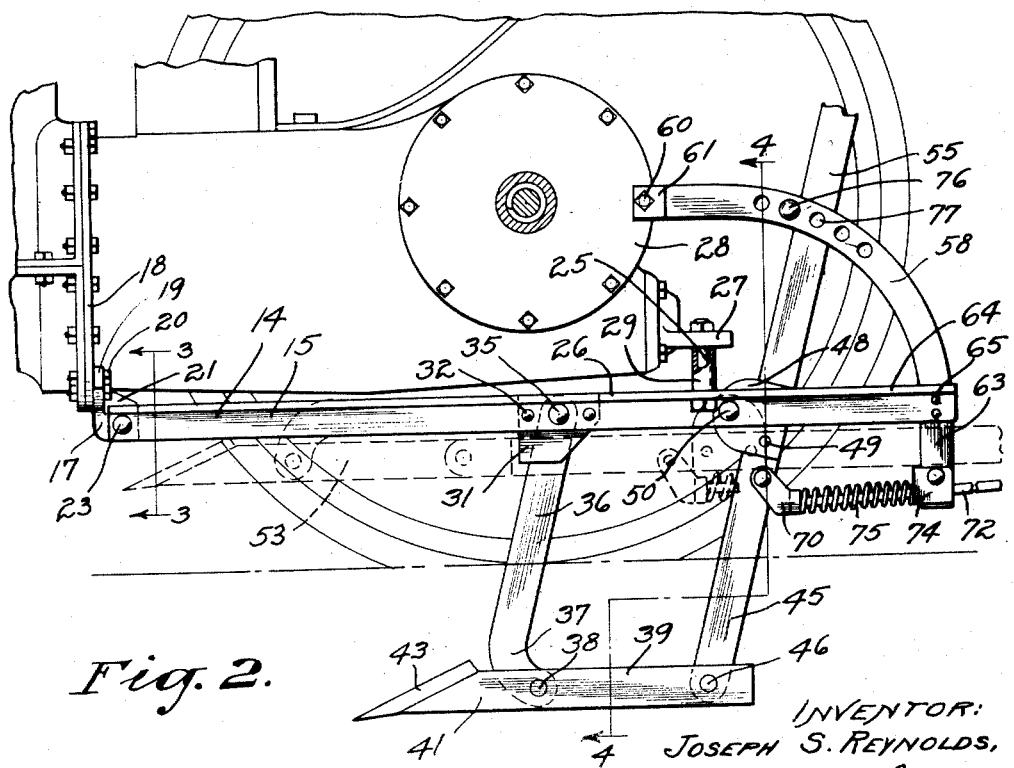
Fig. 2 is an enlarged elevational view clearly showing the subsoil plow of my invention in extended position.

With reference to the drawings, 11 denotes a tractor to which a subsoil plow 12 embodying the features of my invention is secured. With particular reference to Fig. 2, the subsoil plow 12 has a frame 14 composed of angle bars 15 which extend longitudinally below the body of the tractor 11. As shown clearly in Fig. 3, the front end of the frame 14 is secured to the tractor by means of a bracket 17. This bracket 17 is arranged to be bolted to the flanges 18 of the tractor 11, this bracket having portions 19 through which bolts 20 extend for this securement Extending from the portions 19 is a formation 21 having an opening 22 therein, through which a bolt 23 extends. This bolt 23 also extends through vertical legs 24 of the angle bars 15 and secures these angle bars 15 to the formation 21.

As clearly shown in Figs. 2 and 4, the rearward end of the frame 14 is connected to the tractor by means of bolts 25 which extend through horizontal legs 26 of the angle bars 15. These bolts 25 extend through a draw bar cap 27 secured to a housing 28 of the tractor 11. The angle bars 15 are retained in their proper elevation by sleeves 29 which are clamped between the legs 26 and the draw bar cap 27.

Plates 31 are riveted at 32 to the inner faces of the legs 24 of the angle bars 15. Pivoted to the frame 14 at 35 is a forward arm 36 of a plow member supporting means of my invention. The lower end of the arm 36 is curved rearwardly at 37 and pivots at 38 to a bar portion 39 of a plow member 41. The portion 39, as clearly shown in Fig. 4, comprises a pair of bars 42, between which the lower end of the forward arm 36 extends. At the forward end of the bar member 39 is a plow cutter 43. A rearward arm 45 of the plow member supporting means pivots between the bars 42 of the member 39 at 46. The rearward arm 45 extends upwardly and has a pair of plates 48 secured thereto, as by rivets 49, there being a plate 48 secured to each side of the arm 45. Portions of the plates 48 extend forwardly from the arm 45 and have a pivot bolt 50 extending therethrough, by which the arm 45 is eccentrically pivoted to the frame 14.

Figure 1:
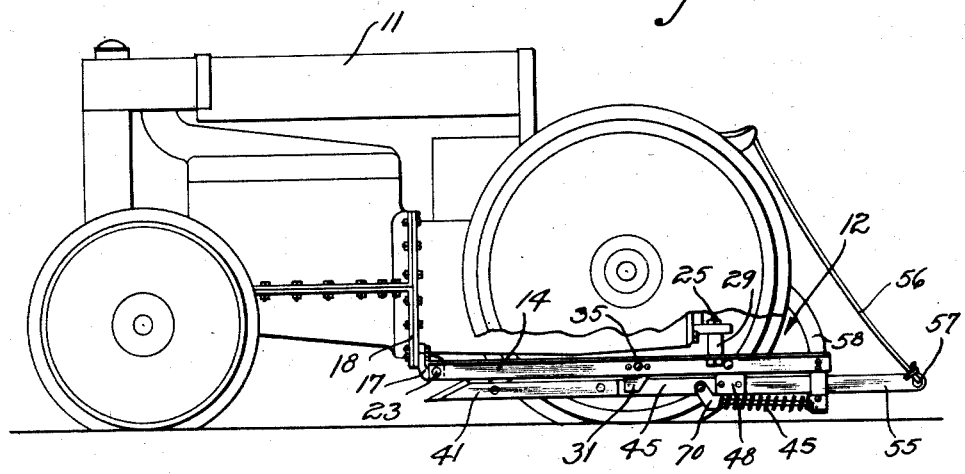

The plow member 41 is shown in carrying position in Fig. 1 and is shown in this position by dotted lines 53 in Fig. 2. It is shown in working position in full lines in Fig. 2. The forward and rearward arms 36 and 45 provide a supporting means for the plow member 41 and consist of a parallel link arrangement. When the plow member is swung from working position into carrying position, it remains in substantially a horizontal plane. The arm 36 is curved at 37 and the arm 45 is eccentrically pivoted to allow an entire collapsing of the plow. It is evident that a curving of the arm 36 allows it to swing entirely between the angle bars 15, and by eccentrically pivoting the arm 45 this arm is allowed to swing below the frame 14 and extend below the forward arm 36. This is clearly shown by the dotted lines 53 in Fig. 2.

The rearward arm 45 extends upwardly in the form of an operating lever 55. A rope 56 is connected to the upper end 57 of the lever 55 and extends to a suitable place on the tractor 11, which place is convenient for actuation by the driver thereof. The operating lever 55 extends between a pair of arcuated stop holding bars 58. The upper ends of the bars 58 are bent outward at 59 for securement to the housing 28 of the tractor 11. Bolts 60 extend through ends 61 of the bars 58 to accomplish the securing of the upper ends to the tractor. This arrangement does not require any special provision as the bolts 60 are standard. The lower ends 63 of the bars 58 extend between the rearward ends 64 of the angle bars 15. These bars 58 are secured to the vertical legs 24 of the angle bars 15, as by rivets 65. They project, however, below the angle bars 15.

The plow member 41 is retained in carrying position by a means for swinging into and retaining the plow member in carrying position, which comprises, as clearly shown in Fig. 5, a clevis 70 which is pivotally secured at 71 to the rearward arm 45. A rod 72 extends from the clevis 70 and passes through an opening 73 in a plate 74 which is secured to the lower ends 63 of the stop carrying bars 58. Compressed between the plate 73 and the clevis 70 is a coil spring 75. This spring 75 at all times exerts a pressure against the clevis 70 which in turn forces against the rearward arm 45. If opposition is not too great, the plow member 41 will be swung into and retained in carrying position.

The operation of the plow of my invention is substantially as follows.

The plow normally rests in carrying or collapsed position, as shown in Fig. 1. When it is desired to subsoil, the driver pulls upon the rope 56. This swings the operating lever 55 upwardly which, as is obvious, swings the arms 36 and 45 downwardly from collapsed position, moving the plow member 41 therewith. As soon as the plow 43 engages the surface of the ground, the force of engagement assists in the swinging of the plow into working position. The plow member 41 swings rearwardly and downwardly until the operating arm 55 engages a stop 76 carried by the stop carrying arms 58. This stop 76 is extended through one of several pairs of openings 77 in the stop carrying arms 58. The stop pin 76 may be placed in any pair of openings according to the desired position of the plow member 41. It is obvious that by limiting the swing of the plow member 41, the working position and depth of cut thereof may be regulated. When the plow member 41 is to be moved into carrying position again, it is necessary to relieve the pressure thereagainst. This is accomplished by backing up the tractor 11. This allows the spring 75 to swing the arms 36 and 45 which accomplishes the swinging of the plow member 41 into carrying position.

From the drawings it is evident that my invention is very compact and does not interfere with the operation of the tractor. When the subsoil plow is not being operated, it may be readily removed from the tractor by removing the bolts 23, 25 and 60.

My invention is so designed and so installed on the tractor 11 that it opposes any tendency for the front end of the tractor to be raised off the ground as sometimes occurs when a tractor is pulling a subsoil plow of a common type. From inspection of Fig. 2 it will be seen that a force applied to the tractor by the cutting action of the plow member 41 is applied below the rear axle of the tractor 11 and to the rear thereof so that the force tends to resist an up tilting of the forward end of the tractor.

The feature of providing an arrangement whereby the plow member 41 does not swing out of the horizontal plane is very important to the invention, as it permits a compact folding of the device beneath the tractor where it is entirely out of the way, and it permits various working positions. A curving of the arm 36 and an eccentric pivoting of the arm 45 allows the members to fold in a compact manner, as shown.

The adjustable working position of the plow allows any depth of cut to be taken. The adjusting is very simple and may be readily accomplished, it being merely necessary to extend the stop pin 76 through a different pair of holes 77.

The automatic means for swinging the plow member 41 into collapsed position is very convenient for the operator.

In the drawing I show a plow member having but one plow blade. I may, however, provide a plurality of blades, or even a plurality of plow members.

I claim as my invention:

1. In a subsoil plow, the combination of: a frame adapted for attachment to a vehicle; a plow member; a pair of arms pivoted to said frame and said plow member for supporting said plow member, one of said arms being curved and the other of said arms being eccentrically pivoted so as to permit said plow member to fold compactly against said frame; means for determining the working position of said plow member; and means for causing said plow member to swing into carrying position.

2. In a subsoil plow, the combination of: a frame adapted for attachment to a vehicle; a plow member; a pair of arms pivoted to said frame and said plow member for supporting said plow member; means for determining the working position of said plow member; a member extending between said frame and one of said arms; and a spring carried by said member for moving said arms so as to swing said plow member into carrying position when said vehicle is backed up a relatively short distance.

3. In a subsoil plow, the combination of: a frame adapted for attachment to a vehicle; a plow member; a pair of arms pivoted to said frame and said plow member for supporting said plow member, one of said arms being curved and the other of said arms being eccentrically pivoted so as to permit said plow member to fold compactly against said frame; means for determining the working position of said plow member; a member extending between said frame and one of said arms; and a spring carried by said member for moving said arm so as to swing said plow member into carrying position when said vehicle is backed up a relatively short distance.

4. In a subsoil plow, the combination of: a frame adapted for attachment to a vehicle; a plow member; a pair of arms pivoted to said frame and said plow member for supporting said plow member; an operating lever extending from one of said arms, whereby said plow member is swung from carrying position into contact with the ground, said contact during the forward motion of said vehicle causing said plow member to be moved into working position; a stop arranged to be engaged by said operating lever for governing said working position of said plow member; a member extending between said frame and one of said arms; and a spring carried by said member for moving said plow member said arm so as to swing said plow member into carrying position when said vehicle is backed up a relatively short distance.

5. A subsoil plow comprising: a longitudinal frame adapted to be rigidly secured to the under side of a tractor; a plow member adapted to lie near to said frame when in folded position; links connecting said plow member to said frame and permitting said plow member to be swung downward from said frame into engagement with the earth so that forward movement of said tractor tends to cause said plow member to dig into the earth; and means for limiting the depth to which the plow member digs.

6. A subsoil plow comprising: a longitudinal frame adapted to be rigidly secured to the under side of a tractor and so that said frame is disposed beneath the rear axle of said tractor; a plow member adapted to lie near to said frame when in folded position; links connecting said plow member to said frame and permitting said plow member to be swung downward from said frame into engagement with the earth so that forward movement of said tractor tends to cause said plow member to dig into the earth; and means for limiting the depth to which the plow member digs.

7. A subsoil plow comprising: a longitudinal frame adapted to be rigidly secured to the under side of a tractor; a plow member adapted to lie near to said frame when in folded position; substantially parallel links connecting said plow member to said frame and permitting said plow member to be swung downward from said frame into engagement with the earth so that forward movement of said tractor tends to cause said plow member to dig into the earth; and means for limiting the depth to which the plow member digs.

8. A subsoil plow comprising: a longitudinal frame adapted to be rigidly secured to the under side of a tractor; a plow member adapted to lie near to said frame when in folded position; links connecting said plow member to said frame and permitting said plow member to be swung downward from said frame into engagement with the earth so that forward movement of said tractor tends to cause said plow member to dig into the earth, said links being deformed from their inter-pivotal axes so as to avoid their interfering with said plow member lying near to said frame when in folded position; and means for limiting the depth to which the plow member digs.

9. A subsoil plow comprising: a longitudinal frame adapted to be rigidly secured to the under side of a tractor; a plow member adapted to lie near to said frame when in folded position; links connecting said plow member to said frame and permitting said plow member to be swung downward from said frame into engagement with the earth so that forward movement of said tractor tends to cause said plow member to dig into the earth; means for moving said plow member from digging position to folded position; and means for limiting the depth to which the plow member digs.

10. A subsoil plow comprising: a longitudinal frame adapted to be rigidly secured to the under side of a tractor; a plow member adapted to lie near to said frame when in folded position; links connecting said plow member to said frame and permitting said plow member to be swung downward from said frame into engagement with the earth so that forward movement of said tractor tends to cause said plow member to dig into the earth; means for moving said plow member from digging position to folded position; an operating lever extending from one of said links for swinging said plow member downward; and stop means for limiting the downward movement of said plow member.

11. A subsoil plow comprising: a longitudinal frame adapted to be rigidly secured to the under side of a tractor; a plow member adapted to lie near to said frame when in folded position; links connecting said plow member to said frame and permitting said plow member to be swung downward from said frame into engagement with the earth so that forward movement of said tractor tends to cause said plow member to dig into the earth; yieldable means tending to move said plow member from digging position to folded position; and means for limiting the depth to which the plow member digs.

12. A subsoil plow comprising: a longitudinal frame adapted to be rigidly secured to the under side of a tractor; a plow member adapted to lie near to said frame when in folded position; links connecting said plow member to said frame and permitting said plow member to be swung downward from said frame into engagement with the earth so that forward movement of said tractor tends to cause said plow member to dig into the earth; yieldable means tending to move said plow member from digging position to folded position; an operating lever extending from one of said links for swinging said plow member downward; and stop means for limiting the downward position of said plow member.

13. A subsoil plow adapted for use with a tractor and comprising: a longitudinal frame adapted to be rigidly secured beneath said tractor; a substantially horizontal plow member; and means for mounting said plow member upon said frame so that said plow member has a folded position, to clear level ground upon which said tractor might be resting, and a digging position in which the point of said plow member is disposed forward from the rear axle of said tractor, and in which said plow member is disposed below the surface of said ground.

14. A subsoil plow adapted for use with a tractor and comprising: a plow member disposed beneath a tractor; and links pivoted to said member and to said tractor for mounting said plow member upon said tractor so that said plow member has a soil non-engaging position and a soil engaging position beneath the surface of the soil, said member lying substantially horizontally in both of these positions.

15. A subsoil plow adapted for use with a tractor and comprising: a plow member disposed beneath a tractor; and links pivoted to said member and to said tractor for mounting said plow member upon said tractor so that said plow member has a soil non-engaging position, a soil engaging position beneath the surface of the soil and a soil digging position, the point of said plow member moving downward and rearward when passing from one of said positions to the next of said positions in the order named.

In testimony whereof, I have hereunto set my hand at Los Angeles, California, this 10th day of March, 1925.

JOSEPH S. REYNOLDS.